United States Patent [19]

Miceli

[11] Patent Number: 5,017,232
[45] Date of Patent: May 21, 1991

[54] POMICE CONTAINING COMPOSITION

[76] Inventor: Joseph J. Miceli, 7902 Limoges Dr., Jacksonville, Fla. 32210

[21] Appl. No.: 492,668

[22] Filed: Mar. 13, 1990

[51] Int. Cl.$^5$ ................................................ C04B 7/02
[52] U.S. Cl. .................................... 106/711; 106/716; 106/763
[58] Field of Search ...................... 106/97, 98, 99, 763, 106/767, 791, 793, 703, 707, 705, 709, 710, 711, 713, 714, 716, 718, 721

[56] References Cited

U.S. PATENT DOCUMENTS 3,232,777  2/1966  Bush ....................................... 106/97
4,259,824  4/1981  Lopez .................................... 106/711

FOREIGN PATENT DOCUMENTS 0027617  3/1978  Japan .

Primary Examiner—William R. Dixon, Jr.
Assistant Examiner—Paul Marcyntoni
Attorney, Agent, or Firm—Thomas C. Saitta

[57] ABSTRACT

A composition for forming a waterproof, high strength, hard material having good insulation properties, comprising a mixture of crushed pumice, type S mortar and glass fibers, which forms the hard material upon the addition of water and after allowing the mixture to cure. The material has superior insulation properties to conventional compositions formed using portland cement instead of type S mortar.

3 Claims, No Drawings

POMICE CONTAINING COMPOSITION

BACKGROUND OF THE INVENTION

The invention relates generally to the field of curable compositions for forming an insulating material, as well as the insulating material itself, as used for example in fireplace or refrigeration constructions In particular, the invention relates to the field of such compositions where the resulting material is a block or panel comprised of crushed pumice, type S mortar, and glass fibers.

For ultra-high temperature or ultra-low temperature applications, special construction materials must be used. Many of the normal construction materials such as wood, metal, concrete block or brick are not suitable for such applications. It is necessary to provide a material whose composition enables it to withstand the extreme temperatures. Many such materials are known in the industry. For example, it is well known to use refractory blocks or bricks in fireplace constructions. These materials have both high temperature resistance and high strength.

A composition which has prove to be successful in these applications includes the use of crushed pumice as an aggregate filler. Pumice is a volcanic stone which is strong yet lightweight A cubic foot can weigh as little as 24 to 30 pounds, due to the presence of numerous sealed air chambers and pockets within the individual stones. Crushed pumice can range in size from pieces three-quarter inches in diameter to that of a grain of sand. Pumice will actually float in water. Prior to this invention, the pumice has always been mixed with portland cement and formed into blocks, panels or bricks. Portland cement is an hydraulic cement produced by pulverizing clinker consisting essentially of hydraulic calcium silicates, usually containing one or more forms of calcium sulfate as an interground addition. The pumice allows for a block roughly one-third lighter in weight than a block of conventional concrete. The pumice block has high insulation properties due to the entrapped air chambers, and is therefor ideally suited for extreme temperature applications.

To be used in fireplace constructions, pumice block must meet minimum standards regarding both compressive strengths and heat penetration. Additionally, the blocks must be able to withstand long-term and repeated high temperature situations without suffering degradation or deterioration. As it is desirable in construction to minimize the amount, size and weight of construction materials, while still meeting the structural requirements and standards, experimentation is ongoing to develop improved construction compositions utilizing pumice.

It has been discovered that pumice panels or blocks having improved structural and temperature insulation properties can be formed of a new composition not known in the field. The pumice blocks of the new composition allow for the use of thinner blocks than those required under the old composition, while providing increased temperature insulation, higher compressive strengths and lesser degradation under long-term conditions.

BRIEF SUMMARY OF THE INVENTION

The composition comprises the combination of pumice, type S mortar, and glass fibers, which when mixed with water form a hard material after curing. Type S mortar is a specialty masonry cement normally used to join and set bricks or concrete blocks. The type S designation is a standard used in the industry, and certifies that the product meets the required ASTM specifications. The composition can be formed into blocks, panels or bricks of various shapes and sizes for use in construction.

DETAILED DESCRIPTION OF THE INVENTION

The composition comprises pumice, type S mortar, and glass fibers, combined and mixed with water to form a curable material. The cured material, in the shape of blocks, panels or bricks, is suitable for use in extreme temperature situations of either high or low temperature. The blocks have high insulating values and high compressive strengths.

The pumice used in the composition is crushed pumice ranging in size from that of a grain of sand up to three-quarters of an inch. The pumice should be of high quality such that impurities are kept to a minimum. The glass fibers are preferably used in the form of short, loose fibers. The glass fibers are added to prevent brittleness in the cured material.

Type S mortar is a specialty cement which meets certain ASTM requirements. The designation is used on various commercially available products. Type S mortar must have a minimum compressive strength at 28 days after curing of 1800 psi. Type S mortar is comprised of, in parts by volume, one part portland cement or portland blast furnace slag cement, at least one-quarter to one-half part hydrated lime, and aggregate material in an amount from two and one-quarter to three times the sum of the other materials. Portland blast furnace slag cement is an intimate and uniform blend of portland cement and fine granulated blast furnace slag produced either by intergrinding portland cement clinker and granulated blast furnace slag or by blending portland cement and finely ground granulated blast furnace slag, in which the slag constituent is between 25 and 65 percent of the weight of the portland blast furnace slag cement. Type S hydrated lime is greater than 95 percent calcium and magnesium oxides and less than 5 percent carbon dioxide, where there are less than 8 percent unhydrated oxides. In addition, type S mortar may contain small amounts of air entraining agents, limestone or other waterproofing materials. Because of the type S mortar, the blocks formed of this composition are waterproof, unlike blocks of standard composition using portland cement.

To form the composition, the preferable combination is approximately two parts by weight of pumice for each one part of type S mortar, with a relatively small amount of glass fibers. For example, approximately 156 pounds of pumice is combined with approximately 78 pounds of type S mortar (the weight of a standard bag). To this is added approximately one ounce of loose glass fibers. To this combination, a suitable amount of water is added to mix the ingredients and initiate the curing process, about five gallons for the weights given above. The mixture is then poured into molds or forms to form the blocks or panels and allowed to cure to form the hard material. It is possible to vary the ratio of pumice to type S mortar from below the 2 to 1 ratio to as much as a 3 to 1 ratio, depending on the particular use, without deleting the improved properties and characteristics of the invention. For the 3 to 1 ratio, approximately 234 pounds of pumice is combined with approximately 78 pounds of type S mortar. In weight percentages, the crushed pumice should be from roughly 60 to 75 percent of the total weight, the type S mortar from roughly 40 to 25 percent, with the glass fibers being significantly less than 1 percent.

To meet the insulation standards, the standard pumice panels made with portland cement instead of type S mortar are usually from 4 to 6 inches thick. The panels made of the type S mortar composition can be made much thinner. For testing purposes, a standard panel four inches thick was used, while a panel only three-quarter inches thick was formed from the composition containing type S mortar. Heat resistance and degradation were tested by direct application of a flame blow torch to the surface of each panel. The standard panel showed no heat penetration with flame temperatures of between 1800 to 2000 degrees after one to one and a half hours. The type S panel had only slight heat penetration under the same conditions, even though the type S panel is less than one-fifth the thickness of the standard panel.

With regard to degradation and deterioration, the differences are even more significant. The standard panel shows deterioration after being subjected to the flame for only one hour. The surface becomes chalky, flakes off and minute cracks are observable. After five similar tests, the four inch panel actually cracks apart. In contrast, the three-quarter inch type S panel shows no chalking and no surface cracking after 20 tests of direct flame application of 1800 to 2000 degrees. In another test, a type S panel was heated at 700 degrees for 72 hours. Again, no degradation or deterioration of any type was observed. Typical refractory materials degrade at 600 degrees.

The type S composition is vastly superior to the standard pumice composition and to standard concrete compositions in structural strength and insulation values, allowing the use of smaller size and volume construction components without sacrificing structural integrity and insulation standards. The type S composition is waterproof, whereas the others are not. The above examples are by way of illustration only, and the true scope and definition of the invention is to be as set forth in the following claims.

I claim:

1. A composition for forming a high strength, hard material with good insulation properties upon the addition of water, comprising a mixture of crushed pumice, type S mortar and glass fibers, where the weight of the crushed pumice is from 60 to 75 percent of the total weight of the mixture, the weight of the type S mortar is from 25 to 40 percent of the total weight of the mixture, and the weight of the glass fibers is significantly less than 1 percent of the total weight of the mixture.

2. A high strength, hard material having good insulation properties, comprising a mixture of crushed pumice, type S mortar and glass fibers, formed by adding water to the mixture and allowing said mixture to harden, where the weight of the crushed pumice is from 60 to 75 percent of the total weight of the mixture, the weight of the type S mortar is from 25 to 40 percent of the total weight of the mixture, and the weight of the glass fibers is significantly less than 1 percent of the total weight of the mixture.

3. A high strength, hard material having good insulation properties, prepared by a process comprising the steps of:

(A) mixing from 60 to 75 percent by weight crushed pumice, 25 to 40 percent weight type S mortar, and significantly less than 1 percent weight glass fibers;

(B) adding sufficient water to form a pourable mixture;

(C) pouring said mixture into a form;

(D) allowing said mixture to cure to form a hard material;

(E) removing said hard material from said form.

* * * * *